United States Patent [19]
Malik et al.

[11] Patent Number: 5,468,841
[45] Date of Patent: Nov. 21, 1995

[54] POLYMERIZATION OF ENERGETIC, CYCLIC ETHER MONOMERS USING BORON TRIFLUORIDE TETRAHYDROFURANATE

[75] Inventors: Aslam A. Malik, Cameron Park; Thomas G. Archibald, Fair Oaks; Roland P. Carlson, Davis; Gerald E. Manser, El Dorado Hills, all of Calif.

[73] Assignee: Aerojet General Corporation, Sacramento, Calif.

[21] Appl. No.: 226,919

[22] Filed: Apr. 13, 1994

[51] Int. Cl.$^6$ .................................................. C08G 65/22
[52] U.S. Cl. ..................... 528/408; 528/417; 552/10; 564/487; 564/504; 568/589; 568/620
[58] Field of Search ............................. 528/408, 417; 552/10; 568/589, 620; 564/487, 504

[56] References Cited

U.S. PATENT DOCUMENTS

| | | | |
|---|---|---|---|
| 3,636,132 | 1/1972 | Saegusa et al. | 260/823 |
| 4,299,993 | 11/1981 | Bethea et al. | 568/617 |
| 4,405,762 | 7/1983 | Earl et al. | 525/410 |
| 4,429,093 | 1/1984 | Koshar | 526/205 |
| 4,474,944 | 10/1984 | Yasuda et al. | 528/408 |
| 4,483,978 | 11/1984 | Manser | 528/417 |
| 4,764,586 | 8/1988 | Manser et al. | 528/362 |
| 4,792,627 | 12/1988 | Aoshima et al. | 564/487 |
| 4,804,424 | 2/1989 | Hinshaw | 149/19.6 |
| 4,970,295 | 11/1990 | Schuchardt | 528/416 |
| 5,210,179 | 5/1993 | Stewart | 528/417 |

FOREIGN PATENT DOCUMENTS 172042 8/1965 U.S.S.R. .

OTHER PUBLICATIONS

Chemical Abstracts 93:186873, "Boron Trifluoride Etherate Catalyst", Gang Chen.
Chemical Abstracts 106:120258, "Mechanism of the Formation of Cyclic Oligomers", Grinevich et al.

*Primary Examiner*—Frederick Krass
*Attorney, Agent, or Firm*—Townsend and Townsend and Crew

[57] ABSTRACT

The present invention provides an improved method of carrying out cationic polymerization of cyclic ether monomers substituted with high-energy, electron-withdrawing pendant groups (e.g., BAMO and NMMO). Such cyclic ether monomers are polymerized with an initiator precursor (i.e., an alcohol) and boron trifluoride tetrahydrofuranate (BF$_3$•THF). It has been discovered that when boron trifluoride tetrahydrofuranate is used as a catalyst in the cationic polymerization of cyclic ether monomers substituted with high-energy, electron-withdrawing pendant groups (e.g., BAMO and NMMO), polymers are produced that have improved functionality and low poly-dispersity. The polymers formed using the method of the present invention are useful for forming cross-linked elastomers which, in turn, are useful for forming elastomeric binders for high-energy compositions, such as propellants, explosives, gasifiers or the like.

11 Claims, 1 Drawing Sheet

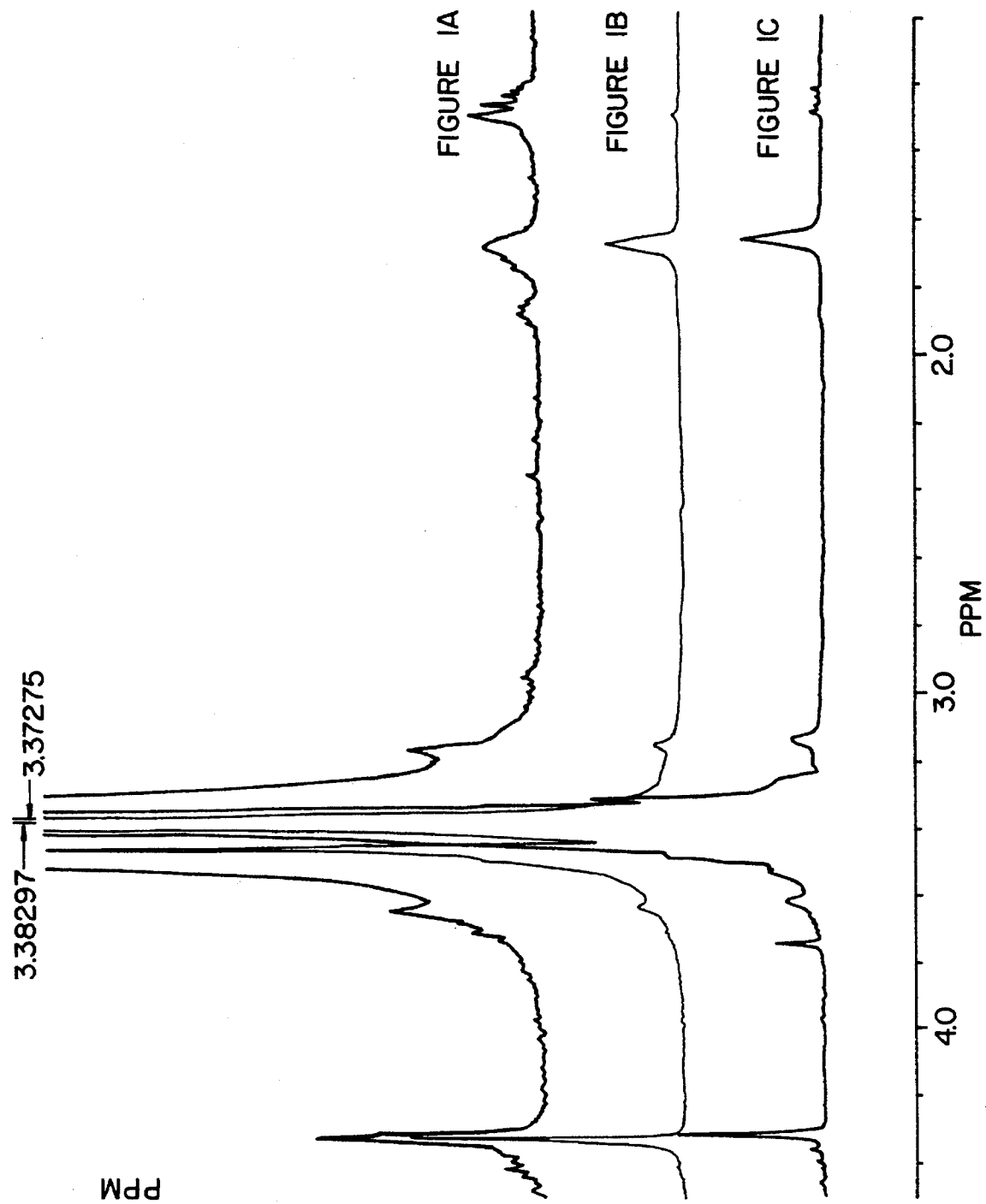

POLYMERIZATION OF ENERGETIC, CYCLIC ETHER MONOMERS USING BORON TRIFLUORIDE TETRAHYDROFURANATE

FIELD OF THE INVENTION

The present invention is directed to an improved method for carrying out cationic polymerization of high energy, cyclic ether monomers. The polymers produced using the method of the present invention are useful for forming cross-linked elastomers which, in turn, are useful for forming elastomeric binders for high-energy compositions, such as propellants, explosives, gasifiers or the like.

BACKGROUND OF THE INVENTION

High-energy solid formulations, such as propellants, explosives, gasifiers or the like, generally consist of particulate solids, such as fuel material, oxidizers, or both, held together by an elastomeric binder. These high-energy formulations may also include a liquid plasticizer, such as a nitrate ester, which contributes to the elastomeric characteristics of the binder and adds additional energy to the formulation.

While the elastomeric binder is an important means of dispersing and immobilizing the fuel material and oxidizer, the materials used in the binder generally burn with substantially lower energy than does the fuel material itself. The binder thus imposes a limit on the energy content available from the fuel material. One way to minimize this limitation is to use an elastomeric binder which releases as much energy as possible when burning with the fuel material. It is desirable, therefore, that the elastomeric binder have pendant groups which themselves are relatively high in energy.

U.S. Pat. Nos. 4,393,199, 4,483,978 and 4,988,797, the teachings of which are incorporated herein by reference, are directed to methods for carrying out cationic polymerization of cyclic ethers to form polymers that can be cross-linked to form elastomeric binders for use in high-energy formulations. Generally, cationic polymerization involves initiation using an adduct, i.e. , an initiator, which is a polyhydric alcohol (e.g., a diol, such as 1,4-butanediol) in conjunction with an acid catalyst such as boron trifluoride or an etherate of boron trifluoride. This adduct complexes with a cyclic ether monomer to form an activated cyclic ether. The activated oxetane monomer then reacts with an unactivated oxetane monomer, opening up the oxetane ring and forming a species with a hydroxyl group on one end and an activated oxetane ring on the other end. The activated oxetane ring at the end of the propagating polymer chain reacts further with another unactivated oxetane, and polymerization proceeds in this manner until substantial exhaustion of cyclic ether monomers or, until the reaction is terminated in some other manner.

In these previously used methods for carrying out cationic polymerization, boron trifluoride etherate is the acid catalyst primarily and preferably used. The use of this ether-containing catalyst results in polymers having good molecular weights and functionalities when highly reactive, cyclic ether monomers, e.g., 3,3-bis(ethoxymethyl)oxetane (BEMO), are used. However, it has been found that the use of boron trifluoride etherate results in less satisfactory polymers when cyclic ether monomers substituted with high-energy, electron-withdrawing pendant groups are used, e.g., 3,3-bis(azidomethyl)oxetane (BAMO) and 3-nitratomethyl-3-methyloxetane (NMMO). In the case of polymers and copolymers formed from cyclic ether monomers substituted with high-energy, electron-withdrawing pendant groups (e.g., BAMO and NMMO), substantial chain termination by both the diethyl ether and the fluoride ion of the boron trifluoride etherate catalyst is observed.

These undesirable side reactions reduce the hydroxyl functionality of the polymer, thereby detracting from the properties of the final polymer product. More particularly, monofunctional materials such as polyethers terminated with —$CH_2F$ or —$OCH_2CH_3$ groups will not form elastomeric materials when cured with polyisocyanates. Such monofunctional materials degrade the overall properties of the polymer, namely the mechanical properties. It has been found, for example, that the polymerization of 3,3-bis(azidomethyl)oxetane with boron trifluoride etherate ($BF_3 \cdot Et_2O$) in the presence of butanediol gives a prepolymer with GPC (Gel Permeation Chromatography) molecular weight (weight average) of 5,386, a polydispersity of 1.35 and a functionality of 1.56.

Both the reduction in hydroxyl functionality and the lack of uniformity in chain length (i.e., high polydispersity) are considered to be disadvantages with respect to forming cross-linked elastomers, e.g., by curing with polyfunctional isocyanates. Moreover, many mechanical and elastomeric properties of the cross-linked elastomers are dependent upon the length of the polymer molecules between the cross links. Thus, high-polydispersity gives rise to unpredictable mechanical and elastomeric properties of the cross-linked elastomers.

U.S. Pat. No. 4,988,797, the teachings of which are incorporated herein by reference, reported that a reduction in the concentration of the boron trifluoride etherate catalyst used could reduce such undesirable termination reactions by a "reactive oligomer" mechanism. Unfortunately, in reducing the concentration of boron trifluoride etherate used, the reaction rate of the polymerization reaction is significantly reduced and thus, this method is impractical for large-scale, commercial applications.

In view of the foregoing, there remains a need for improved methods of cationic polymerization for energetic, cyclic ethers which provide for greater control of the polymerization reaction. The present invention remedies this need by providing such methods.

SUMMARY OF THE INVENTION

It has now been discovered that when boron trifluoride tetrahydrofuranate ($BF_3 \cdot THF$) is used as a catalyst in the cationic polymerization of cyclic ether monomers substituted with high-energy, electron-withdrawing pendant groups (e.g., BAMO and NMMO), polymers are produced that have improved functionality and low polydispersity. These particular polymers have been found to be extremely useful for forming cross-linked elastomers which, in turn, are useful for forming elastomeric binders for high-energy compositions, such as propellants, explosives, gasifiers or the like.

The rate of polymerization of cyclic ether monomers is dependent on both the steric and electronic properties of the pendant groups. As such, cyclic ether monomers substituted with high-energy, electron-withdrawing and/or bulky pendant groups polymerize at a much slower rate than unsubstituted cyclic ether monomers. Due to the slow rate of polymerization, side reactions such as ether- and fluoride-termination reactions dominate leading to the formation of prepolymers with low functionality and high polydispersity.

Prepolymers with low functionality and high polydispersity are not desirable since they lead to materials having poor mechanical and elastomeric properties.

As such, the choice of catalyst used is critical when cyclic ether monomers substituted with high-energy, electron-withdrawing and/or bulky pendant groups are polymerized. In other words, it has been discovered that while the choice of catalyst is not so critical when highly reactive, cyclic ether monomers (e.g., 3,3-bis-(ethoxymethyl)oxetane (BEMO)) are polymerized, the choice of catalyst can make a difference between obtaining materials with useful properties and those without when cyclic ether monomers substituted with high-energy, electron-withdrawing and/or bulky pendant groups are polymerized. Both $BF_3$•etherate and $BF_3$•THF are suitable catalysts for the polymerization of highly reactive cyclic ether monomers, but not for the polymerization of cyclic ether monomers substituted with high-energy, electron-withdrawing and/or bulky pendant groups. In this latter case, it has been discovered that $BF_3$•THF is a surprisingly superior catalyst that results in well-defined hydroxy-terminated polymers having good functionality and low polydispersity, without effecting the rate of polymerization.

Moreover, unlike boron trifluoride etherate, $BF_3$•THF is not significantly hydroscopic and does not fume in air. The lower vapor pressure allows $BF_3$•THF to be weighed and transferred without special handling or precautions. $BF_3$•THF is stable indefinitely at ambient temperature and does not decompose to give brown solutions as does the etherate. As a result of these physical and chemical characteristics, $BF_3$•THF is an easier catalyst to handle in large scale reactions without a significant increase in cost.

Boron trifluoride tetrahydrofuranate ($BF_3$•THF) was first prepared by dissolving boron trifluoride gas in tetrahydrofuran. The tetrahydrofuranate was found to be more stable than the corresponding etherate complex. It has now been discovered that the tetrafuranate complex can readily be prepared from the commercially available etherate complex by a simple exchange reaction. In this reaction, an excess of tetrahydrofuran is added to boron trifluoride etherate, and the mixture refluxed for about one hour. The volatile solvents are removed by distillation at atmospheric pressure, and $BF_3$•THF is isolated in quantitative yield by vacuum distillation at 75° C. (5 Torr). As such, boron trifluoride tetrahydrofuranate can be readily prepared without having to use the difficult-to-handle boron trifluoride gas.

Other advantages, objects, features and embodiments of the present invention will become apparent from the detailed description which follows.

BRIEF DESCRIPTION OF THE FIGURES

FIG. 1 sets forth the NMR spectra of poly-BAMO prepared using the $BF_3$•$Et_2$ catalyst (top trace, (A)); the "reactive oligomer" method disclosed and claimed in U.S. Pat. No. 4,988,797 (middle trace, (B)); and the $BF_3$•THF catalyst (bottom trace, (C)).

DETAILED DESCRIPTION OF THE INVENTION AND PREFERRED EMBODIMENTS

The present invention provides a method for polymerizing an energetic, cyclic ether monomer which is capable of cationic polymerization, the method comprising: providing an energetic, cyclic ether monomer capable of cationic polymerization; providing an initiator precursor and boron trifluoride tetrahydrofuranate ($BF_3$•THF), the initiator precursor being such that it will form an adduct with the boron trifluoride tetrahydrofuranate which will in turn initiate cationic polymerization of the energetic, cyclic ether monomer; combining the initiator precursor with the boron trifluoride tetrahydrofuranate to form a mixture; and bringing the mixture of the initiator precursor and the boron trifluoride tetrahydrofuranate into contact with the energetic, cyclic ether monomer so as to effect polymerization of the energetic, cyclic ether monomer.

In the method of the present invention, certain terms used are defined as follows. The term "initiator precursor" is used herein to refer to an organic compound which forms, with a catalyst, an adduct or complex, such adduct or complex being an initiator. The term "catalyst" is used herein to refer to boron trifluoride tetrahydrofuranate ($BF_3$•THF), a substance which is capable of forming an adduct or complex with the initiator precursor and which is capable of catalyzing cationic polymerization. The term "initiator" or "initiator compound" is used herein to refer to an adduct of an organic compound with a catalyst which results, when brought into contact with a cyclic ether monomer, in the formation of an initiating species which starts (i.e., initiates) the formation of a polymer chain(s). The term "monomer" is used herein to refer to a simple molecule which is capable of cationic polymerization. The term "cyclic ether monomer" is used herein to refer to three, four, and five membered rings which are characterized by ring strain and which are susceptible to cationic polymerization. The term "living polymer" is used herein to refer to the positively charged (cationic) chain(s) resulting from the reaction of an initiating species with a monomer.

The initiator precursor used in the process of the present invention may be chosen from those known in the art, including, but not limited to, mono- and polyhydric alcohols, such as, for example, methanol, butane-1,4-diol, propane-1,3-diol, trifluoroethanol, trimethylolethane, trimethylolpropane and pentaerythritol. In a presently preferred embodiment of the present invention, the preinitiator precursor used is either trifluoroethanol or trimethylolpropane. It will be understood that the number of functional hydroxy groups on the alcohol generally determines the functionality of the polymer chain which grows therefrom; thus, a diol will give rise to a difunctional polymer, a triol to a trifunctional polymer, etc.

Boron trifluoride tetrahydrofuranate ($BF_3$•THF) is the acid catalyst used in the method of the present invention. It has been discovered that $BF_3$•THF is a surprisingly superior catalyst for the polymerization of cyclic ether monomers substituted with high-energy, electron-withdrawing and/or bulky pendant groups. When $BF_3$•THF is mixed with the initiator precursor, e.g., an alcohol, it has been found that the initiator precursor displaces the tetrahydrofuran (THF) thereby forming an adduct or complex with $BF_3$. It has further been found that the displaced THF is incorporated into the polymer chain. This incorporation of THF may occur in either the initiation, propagation or termination stages of the polymerization reaction depending upon the reactivity ratios of the monomer or monomers being polymerized. Regardless of its place of incorporation, quantitative analysis of the polymers formed using $BF_3$•THF as a catalyst reveals that essentially all of the tetrahydrofuran present in the original catalyst is present in the product. For example, in the case of 8,000 molecular weight poly-BAMO (functionality equal to 2), an average of 5.5 tetrahydrofurans (as butane-1,4-diol ether moieties) were incorporated into each of the polymer chains.

Moreover, it has now been discovered that boron trifluoride tetrahydrofuranate (BF$_3$•THF) can readily be prepared from the commercially available etherate complex by a simple exchange reaction. In this reaction, an excess of tetrahydrofuran is added to boron trifluoride etherate, and the mixture refluxed for about one hour. The volatile solvents are removed by distillation at atmospheric pressure, and BF$_3$•THF is isolated in quantitative yield by vacuum distillation at 75° C. (5 Torr). As such, boron trifluoride tetrahydrofuranate can now be readily prepared without having to use the difficult-to-handle boron trifluoride gas.

It may be preferable to add the catalyst, i.e., BF$_3$•THF, to the initiator precursor, e.g., trifluorethanol or trimethyolpropane, to allow the initiator (i.e., the alcohol-catalyst adduct) to sufficiently form. A mixture or stock of alcohol-catalyst adduct may be prepared in advance and used as needed. Alternatively, the catalyst, the initiator precursor and the cyclic ether monomer(s) can be simultaneously mixed with one another. In either case, an alcohol-catalyst adduct is formed that serves as the initiator for the overall polymerization reaction. Generally, the mol ratio of catalyst (i.e., BF$_3$•THF) to initiator precursor (e.g., trifluorethanol or trimethyolpropane) is approximately 1 mol of BF$_3$•THF to 1 mol of initiator precursor.

Polymerization in accordance with the present invention may be conducted with a single monomer species to form a homopolymer or with a mixture of monomer species to form a copolymer. The monomers used in the present invention are those which are susceptible to cationic polymerization. Cyclic ethers having three, four, and five membered rings, which are characterized by ring strain, are susceptible to this type of polymerization. In a presently preferred embodiment, oxetane monomers are the cyclic ethers used in the process of the present invention. The oxetane monomers used have the general formula:

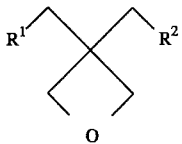

in which R$^1$ and R$^2$ are independently selected and may be functional groups including, but not limited to, H, lower alkyl, NF$_2$, ONO$_2$, NO$_2$, N$_3$, and N(R$^3$)NO$_2$, where R$^3$ is H or a lower alkyl. Examples of energetic oxetane monomers used to form the polymers, either homopolymers or copolymers, in accordance with the present invention include, but are not limited to, the following: 3-azidomethyl-3-methyloxetane (AMMO); 3-nitratomethyl-3-methyloxetane (NMMO); 3,3-bis(methylnitratomethyl)oxetane (BMNAMO); 3-methylnitratomethyl-3-methyloxetane (MNAMMO), 3,3-bis(azidomethyl)oxetane (BAMO); 3,3-bis(nitromethyl)oxetane; 3-difluoroaminomethyl-3-methyloxetane; and 3,3-bis(difluoroaminomethyl)oxetane. It will be understood that "energetic" refers to the energy released by decomposition of the azido, nitro, nitrato and difluoroamino pendant groups. That is to say, apart from heat of combustion an energetic monomer and an energetic polymer have a positive heat of decomposition. It will be further understood that other energetic groups, exemplified by azido, nitro, nitrato and difluoroamino, may also be used.

Any solvent known to be compatible with cationic polymerization with respect to solubility of reactants, stability of the cation formed, etc., may be used. In addition to the solvents used in the examples, suitable solvents include, but are not limited to, the following: methylene chloride, Freons, hydrocarbons, chloroform, methyl chloride, ethylene chloride, nitromethane and chlorinated aromatic hydrocarbons, such as, for example, cholorbenzene. In a presently preferred embodiment of the present invention, methylene chloride is the solvent used.

The polymerization reaction is carried out in the absence of any substance which would prevent or prematurely terminate the reaction. The time required to complete or substantially complete polymerization depends upon the reactants and the catalyst used. Polymerization will proceed by chain propagation until substantial exhaustion (e.g., greater than 95%) of the cyclic ether monomers or, until the reaction is terminated in some other manner. The resulting living polymers (i.e., cations) may be terminated in a number of different ways. Termination may be accomplished by adding water to produce terminal hydroxy groups; by adding ammonia or an amine to produce terminal amino groups (e.g., NH$_2$ from ammonia or —NHCH$_3$ from methyl amine); by adding a carboxylic acid or its salt to produce a terminal ester group (e.g., addition of acetic acid produces an acetate group, CH$_3$COO—); or by adding a mineral acid such as HCl, H$_2$SO$_4$ or HF to produce terminal chlorine, sulfate or fluorine atoms or groups. In general, any terminating species known to terminate living cationic polymers may be used. In a presently preferred embodiment of the present invention, the living polymers are terminated by the alcohol present in the reaction mixture and/or by adding water to produce polymers with terminal hydroxyl groups.

The length of the polymer chains is largely dependent upon the molar equivalents of monomers (m) and the initiators (n), the average chain length being approximately m/n mer units long. Generally, for use in binders, polyether chains are prepared having molecular weights (weight average) of between about 2,000 and about 25,000. It will be readily apparent to those in the art, however, that polyether chains having higher molecular weights (e.g., from 1,000 to about 100,000 (weight average)) can readily be prepared using the method of the present invention. Distribution of mer units throughout the polymer chains and polydispersity of the chains depends upon specific polymerization conditions. Polyethers in accordance with the present invention generally have polydispersities between about 1.5 and about 2.0.

If a copolymer is formed, the distribution of mer units derived from Monomer I and mer units derived from Monomer II will depend upon the reactivity ratios of the monomers and upon the proportions in which they are mixed in the charge. If both Monomer I and Monomer II have similar reactivity ratios and if they are charged in roughly equimolar proportions, the resulting polymer will be an atactic polymer having a random distribution of mer units. If, however, Monomer I is more reactive than Monomer II and if Monomer I and Monomer II are charged in equimolar proportions, it can be expected that the head end of the copolymer will predominate in mer units from Monomer I, the tail end in Monomer II, and the mid-portion of the polymer will have a more nearly random distribution of mer units brought about by the fact that the predominance of molecules of Monomer II compensate for its lesser reactivity. As such, the molar ratio of mer units in the polymer formed will depend on both the relative reactivity ratios of the monomers used in the polymerization reaction and the proportions in which they are mixed in the charge.

In a presently preferred embodiment, the polymers of the present invention are hydroxy-terminated, and thus they are curable with isocyanates through chain extension and cross-linkable to form elastomers. Polymeric chains which terminate at both ends with primary alcohol groups have a particular advantage since such groups are more reactive toward isocyanate groups during curing than the corresponding secondary and tertiary hydroxyl end groups. Elastomers are formed from the polyethers of the present invention by curing with isocyanates having a functionality of at least two, e.g., toluene diisocyanate. To promote chain elongation, at least one equivalent of an isocyanate is required. Preferably, cross-linking is also promoted by using an isocyanate of higher functionality or, by adding a separate cross-linking agent, such as, for example, trimethylolethane or trimethylolpropane.

When boron trifluoride tetrahydrofuranate ($BF_3 \cdot THF$) is used as a catalyst in the cationic polymerization of cyclic ether monomers substituted with high-energy, electron-withdrawing pendant groups (e.g., BAMO and NMMO), polymers are produced that have improved functionality and low poly-dispersity. Although the choice of catalyst is not so critical when highly reactive, cyclic ether monomers (e.g., 3,3-bis(ethoxymethyl)oxetane (BEMO)) are polymerized, the choice of catalyst can make a difference between obtaining materials with useful properties and those without when cyclic ether monomers substituted with high-energy, electron-withdrawing and/or bulky pendant groups are polymerized. Both $BF_3 \cdot$ etherate and $BF_3 \cdot THF$ are suitable catalysts for the polymerization of highly reactive cyclic ether monomers, but not for the polymerization of cyclic ether monomers substituted with high-energy, electron-withdrawing and/or bulky pendant groups. In this latter case, it has been discovered that $BF_3 \cdot THF$ is a surprisingly superior catalyst that results in well-defined hydroxy-terminated polymers having good functionality and low polydispersity.

For example, the $BF_3 \cdot THF$ catalyzed polymerization of BAMO in the presence of butanediol as a proton source gives an 84% yield of an 8,000 molecular weight polymer having a functionality of 1.94. Moreover, 3-nitratomethyl-3-methyloxetane (NMMO) can be polymerized with $BF_3 \cdot THF$ in the presence of trimethylolpropane (TMP) to give a quantitative yield of poly-NMMO with a GPC (Gel Permeation Chromatography) molecular weight of about 5,100, a polydispersity of 1.2 and a functionality of 2.90. Similarly, mixtures of BAMO and NMMO can be reacted with the $BF_3 \cdot THF$ catalyst to give 80–95% yields of BAMO-NMMO copolymers. Cyclic ether monomers substituted with non-energetic pendant groups (e.g., 3-ethyoxy-3-methyloxetane) are also readily polymerized with the $BF_3 \cdot THF$ catalyst but, as previously mentioned, the choice of catalyst when polymerizing such polymers is not so critical.

This invention will be described in greater detail by way of specific examples. The following examples are offered for illustrative purposes, and are intended neither to limit or define the invention in any manner.

EXAMPLE I

This example illustrates the preparation and properties of boron trifluoride tetrahydrofuranate (i.e., $BF_3 \cdot THF$).

Boron trifluoride etherate (98 mL, 113 g, 0.8 mol) was added slowly to tetrahydrofuran (210 mL, 186 g, 2.58 mol) with ice cooling to maintain the temperature at 30°–33° C. The solution was refluxed for 1 h and then the volatiles were removed by distillation at atmospheric pressure to a pot temperature of 107° C. The residue was distilled at 0.2 Torr to give a small forerun at 20°–33° C. followed by 110 g (98%) of boron trifluoride tetrahydrofuranate at 40°–45° C. (0.2 Torr) or 75° C. (5 Torr). NMR: $^1H$ NMR 2.10 (m, 4 H), 4.29 (m, 4H); $^{13}C$ NMR 24.33, 72.80; $^{19}F$ NMR −156.31.

EXAMPLE II

This example illustrates the preparation and properties of poly-3,3-bis(azidomethyl)oxetane using boron trifluoride tetrahydrofuranate (i.e., $BF_3 \cdot THF$).

A solution of 1,4-butanediol (150 mg, 1.67 mmol) and $BF_3 \cdot THF$ (577 mg, 4.12 mmol) in anhydrous methylene chloride (10 mL) was stirred at ambient temperature for 15 minutes under nitrogen in a dry polymerization flask. Next, a solution of 3,3-bis(azidomethyl)oxetane (6.92 g, 41.2 mmol) in methylene chloride (6 mL) was added over 45 minutes and the resulting solution was stirred at room temperature for 16 h. The progress of the reaction was monitored by $^1H$ NMR spectroscopy and when the reaction was 95% complete, it was quenched with water. The mixture was slowly added to methanol (80 mL) and the precipitated solid was filtered and dried (50° C./10 mm-Hg/24 h) to give 5.81 g, representing an 84% yield, of poly-3,3-bis(azidomethyloxetane), a white granular solid: Gel Permeation Chromatography (GPC) (THF): Number Average Molecular Weight (Mn) 5,942; Weight Average Molecular Weight (Mw) 8,167; Polydispersity (Disp.) 1.37; NMR: $^1H$ NMR δ 1.61 (s, $-CH_2$ from THF), 3.35–3.83 (m, backbone and pendant $-CH_2-$ groups); $^1H$ NMR (TFAA added) δ 1.64 (s), 3.36–3.82 (m, backbone and pendant $-CH_2-$ groups), 4.29 (s, $-CH_2OCOCF_3$); $^{13}C$ NMR δ 26.22, 45.19, 53.06, 68.84, 69.14, 70.07, 71.14.

A detailed analysis of the above polymer by $^1H/^{19}F$ NMR spectroscopy revealed that 3% of the end groups were terminated by $-CH_2F$ groups. The presence of $-CH_2F$ end groups was indicated by a doublet (J=49 Hz) at δ 4.35 in $^1H$ NMR and a triplet at δ −225 in $^{19}F$ NMR. Based on this dam, the functionality of the polymer was determined to be 1.94.

EXAMPLE III (Comparative)

This example relates to the preparation and properties of poly-3,3-bis(azidomethyl)oxetane using the boron trifluoride etherate catalyst (i.e., $BF_3 \cdot Et_2O$).

A solution of 3,3-bis(azidomethyl)oxetane (2.043 g, 12.16 mmol) in anhydrous methylene chloride (2 mL) was added drop-wise over a period of 30 minutes to a mixture of $BF_3 \cdot Et_2O$ (179.4 mg, 1.26 mmol), 1,4-butanediol (BDO, 48 mg, 0.53 mmol), and methylene chloride (4 mL) at 5° C. The mixture was stirred at 5°–10° C. for 15 minutes, warmed to room temperature and stirred at ambient temperature for 16 hours. When the reaction was 93% complete, as indicated by $^1H$ NMR spectroscopy, water was added and the reaction mixture was slowly precipitated into methanol (75 mL). The precipitated solid was filtered, washed with methanol, and dried (50° C./10 mm-Hg/24 h) to give 1.50 g, representing an 83% yield, of poly(3,3-bis(azidomethyloxetane), a white granular solid: Gel Permeation Chromatography (GPC) (THF): Number Average Molecular Weight (Mn) 4,000; Weight Average Molecular Weight (Mw) 5,386; Polydispersity (Disp.) 1.35; NMR: $^1H$ NMR δ 1.80 (br s), 3.35–3.83 (m, backbone and pendant $-CH_2-$ groups); $^1H$ NMR (TFAA added) δ 1.70–1.90 (m, $-CH_2-$ groups from BDO), 3.36–3.82 (m, backbone and pendant $-CH_2-$ groups), and 4.29 (s, $-CH_{2OCOCF3}$); $^{13}C$ NMR δ 45.0, 53.3, 68.9, 69.1, 70.2, and 71.0.

A detailed analysis of the above polymer by $^1H/^{19}F$ NMR spectroscopy revealed that 18% of the end groups were terminated by $-OCH_2CH_3$ groups and 4% were terminated by $-CH_2F$ groups. The presence of $-OCH_2CH_3$ groups was indicated by a triplet at δ 1.2 in $^1$H NMR, whereas the presence of —CH$_2$F end groups was indicated by a doublet (J=49 Hz) at δ 4.35 in $^1$H NMR and a triplet at δ −225 in $^{19}$F NMR. Based on this data, the functionality of the polymer was determined to be 1.56.

EXAMPLE IV

This example relates to the preparation and properties of poly-3-nitrato-methyl-3-methyloxetane using boron trifluoride tetrahydrofuranate (i.e., BF$_3$•THF).

A solution of 1,1,1-trimethylolpropane (4.66 g, 34.8 mmol) and boron trifluoride tetrahydrofuranate (4.84 g, 34.6 mmol) in methylene chloride (400 mL) was stirred at ambient temperature for 25 min under nitrogen in a dry polymerization flask. Then, a solution of 3-nitratomethyl-3-methyloxetane (600 g, 4.08 mol) in methylene chloride (180 mL) was added over 2.5 h, such that the temperature of the reaction was maintained between 20° and 23° C. The resultant solution was stirred for 16 h at which time $^1$H NMR analysis of an aliquot indicated that the NMMO had been consumed. At this point, TMP (4.2 g, 31.3 mmol) was added and the mixture was stirred at ambient temperature for 30 mins. Water (100 mL) was added and the organic layer was separated, washed three times with brine and dried over magnesium sulfate (MgSO$_4$), and the solvent was removed on a rotary evaporator and the residual oil was dried 17 h in vacuo (0.5 Torr) to give 604.7 g, representing a 100% yield, of the NMMO homopolymer: Gel Permeation Chromatography (GPC) (THF): Number Average Molecular Weight (Mn) 4,270; Weight Average Molecular Weight (Mw) 5,196; Polydispersity (Disp.) 1.21; Hydroxyl functionality 2.90; NMR: $^1$H NMR 0.96 (s), 0.99 (s), 1.56 (s), 3.27 (m), 3.37 (m), 4.39 (m); $^{13}$C NMR 16.95, 17.28, 26.00, 40.37, 66.55, 71.50, 73.53, 74,84; $^{19}$F NMR no signal detected.

EXAMPLE V

This example relates to the preparation and properties of the copolymer formed from 3,3-bis(azidomethyl)oxetane and 3-nitratomethyl-3-methyloxetane using boron trifluoride tetrahydrofuranate (i.e., BF$_3$•THF).

A solution of 1,1,1-trimethylolpropane (174 mg, 1.30 mmol) and boron trifluoride tetrahydrofuranate (191 mg, 1.36 mmol) in methylene chloride (35 mL) was stirred at ambient temperature for 15 min under nitrogen in a dry polymerization flask. Then, a solution of 3,3-bis(azidomethyl)oxetane (10.5 g, 62.5 mmol) and 3-nitratomethyl-3-methyloxetane (2.5 g, 17.0 mmol) in methylene chloride (10 mL) was added over 25 min, and the resultant solution was stirred for 16 h at which time $^1$H NMR analysis of an aliquot indicated that 90% of the BAMO and 100% of the NMMO had been consumed. At this point, TMP (150 mg, 1.12 mmol) was added and the mixture was stirred at ambient temperature for 30 mins. The polymer was precipitated by adding the reaction mixture to methanol (325 mL) at 10° C. The precipitate was decanted and was dried at 50° C. for 24 h in vacuo (2 mm) to give 11.0 g, representing an 85% yield, of the BAMO-NMMO copolymer: Gel Permeation Chromatography (GPC) (THF): Number Average Molecular Weight (Mn) 3,248; Weight Average Molecular Weight (Mw) 3,802; Polydispersity (Disp.) 1.17; Hydroxyl functionality 1.95; NMR: $^1$H NMR 0.98 (s), 1.01 (s), 1.61 (s), 3.33 (m), 4.31 (s), 4.41 (s), 4.46 (s); $^{13}$C NMR 17.36, 26.19, 40.29, 45.17, 45.31, 50.95, 51.67, 51.72, 62.82, 68.82, 69.11, 69.64, 70.04, 70.87, 71.13, 73.59, 74.72; $^{19}$F NMR −236.0 (t, J=50 Hz) very weak signal.

EXAMPLE VI

In this example, the NMR spectra of poly-BAMO prepared using the BF$_3$•THF catalyst (bottom trace) is compared to poly-BAMO prepared using the BF$_3$•Et$_2$ catalyst in FIG. I. The top trace shows the result of ether catalyst at a 2:1 ratio of butanediol (conventional method); the middle trace is the "reactive oligomer" ether catalyzed polymer prepared using the method disclosed and claimed in U.S. Pat. No. 4,988,797. Poly-BAMO was prepared with the BF$_3$•THF catalyst using the procedure set forth in Example II. Poly-BAMO was prepared with the BF$_3$•Et$_2$O catalyst using the conventional procedure set forth in Example III and, in addition, using the "reactive oligomer" procedure disclosed and claimed in U.S. Pat. No. 4,988,797.

The top trace (FIG. 1 (A)) is the $^1$H NMR of poly(BAMO) prepared using BF$_3$•etherate as a catalyst. The triplet at 1.2 is indicative of mono-functional material with —OCH$_2$CH$_3$ end groups, whereas the signal at 4.27 is indicative of monofunctional material with —CH$_2$F end groups. Comparison of this top trace with the bottom trace (FIG. 1(C)), which is of poly(BAMO) prepared using BF$_3$•THF as a catalyst, clearly indicates that the material prepared with the BF$_3$•THF catalyst does not have any —OCH$_2$CH$_3$ terminated mono-functional material. Also, this comparison indicates that the amount of mono-functional material with —CH$_2$F termination is much less in the bottom trace than in the top trace. Comparison of the middle trace (FIG. 1 (B)) with the bottom trace reveals that the material prepared using BF$_3$•THF as a catalyst is at least equal, if not superior, in quality to the material prepared using the "reactive oligomer" approach. (Both materials are devoid of —OCH$_2$CH$_3$ terminated monofunctional materials, but both have small amounts of —CH$_2$F terminated material as indicated by the signal present at 4.27.)

The foregoing is offered primarily for purposes of illustration. It will be readily apparent to those of skill in the art that the operating conditions, materials, procedural steps and other parameters of the systems described herein may be further modified or substituted in various ways without departing from the spirit and scope of the present invention.

What is claimed is:

1. A method for polymerizing an energetic, oxetane monomer which is capable of cationic polymerization, said method comprising:

providing an energetic, oxetane monomer capable of cationic polymerization;

providing an initiator precursor and boron trifluoride tetrahydrofuranate (BF$_3$•THF), said initiator precursor being such that it will form an adduct with said boron trifluoride tetrahydrofuranate which will in turn initiate cationic polymerization of said energetic, oxetane monomer;

combining said initiator precursor with said boron trifluoride tetrahydrofuranate to form a mixture; and bringing said mixture of said initiator precursor and said boron trifluoride tetrahydrofuranate into contact with said energetic, oxetane monomer so as to effect polymerization of said energetic, oxetane monomer.

2. A method in accordance with claim 1 wherein said energetic, oxetane monomer is substituted with an energetic pendant group selected from the group consisting of azido, nitro, nitrato and difluoroamino.

3. A method in accordance with claim 2 wherein said oxetane monomer is 3,3-bis(azidomethyl)oxetane.

4. A method in accordance with claim 2 wherein said oxetane monomer is 3-nitratomethyl-3-methyloxetane.

5. A method in accordance with claim 2 wherein said oxetane monomer is 3-difluoroaminomethyl-3-methyloxetane.

6. A method in accordance with claim 2 wherein said oxetane monomer is 3,3-bis(difluoroaminomethyl)oxetane.

7. A method in accordance with claim 2 wherein said oxetane monomer is a mixture of 3,3-bis(azidomethyl)oxetane and 3-nitratomethyl-3-methyloxetane.

8. A method in accordance with claim 1 wherein said initiator precursor is an alcohol.

9. A method in accordance with claim 8 wherein said alcohol is a polyol selected from the group consisting of diols, triols and tetraols.

10. A method in accordance with claim 9 wherein said polyol is selected from the group consisting of butanediol, trimethylolethane, trimethylolpropane and pentaerythritol.

11. A method in accordance with claim 1 wherein said initiator precursor is water.

* * * * *